United States Patent
Azuma et al.

(10) Patent No.: US 6,430,150 B1
(45) Date of Patent: *Aug. 6, 2002

(54) COMMUNICATION NODE, RESTORATION METHOD AND COMMUNICATION NETWORK

(75) Inventors: Mitsuhiro Azuma, Kawasaki (JP); Haim Kobrinski, Colts Neck; Tsong Ho Wu, Englishtown, both of NJ (US)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 08/643,761

(22) Filed: May 6, 1996

(30) Foreign Application Priority Data

Feb. 14, 1996 (JP) .............................. 8-027126

(51) Int. Cl.[7] .................... H04L 12/407; G01R 31/08
(52) U.S. Cl. .................. 370/218; 370/228; 370/255; 370/400; 340/825.01; 709/239
(58) Field of Search ............................ 395/181, 182.02, 395/200.68, 200.69, 200.72, 200.73, 200.52; 370/216, 217, 221, 225, 400, 406, 410, 254, 255–256, 409, 392, 227, 228; 709/239–244; 340/825.01

(56) References Cited

U.S. PATENT DOCUMENTS

| | | | |
|---|---|---|---|
| 4,679,186 A | * 7/1987 | Lea | 370/218 |
| 4,679,189 A | * 7/1987 | Olson et al. | 370/396 |
| 4,884,263 A | * 11/1989 | Suzuki | 370/225 |
| 4,933,936 A | * 6/1990 | Rasmussen et al. | 370/406 |
| 5,084,816 A | * 1/1992 | Boese et al. | 370/225 |
| 5,093,824 A | * 3/1992 | Coan et al. | 370/228 |
| 5,235,599 A | 8/1993 | Nishimura et al. | 371/11.2 |
| 5,627,822 A | * 5/1997 | Edmaier et al. | 370/390 |
| 5,646,936 A | * 7/1997 | Shah et al. | 370/228 |
| 5,732,072 A | * 3/1998 | Thanner et al. | 370/255 |
| 5,742,820 A | * 4/1998 | Perlman et al. | 395/200.72 |
| 5,805,593 A | * 9/1998 | Busche | 370/238 |
| 5,883,881 A | * 3/1999 | Croslin | 370/221 |
| 6,026,077 A | * 2/2000 | Iwata | 370/254 |
| 6,038,212 A | * 3/2000 | Galand et al. | 370/216 |
| 6,069,894 A | * 5/2000 | Holender et al. | 370/397 |
| 6,075,766 A | * 6/2000 | Croslin | 370/225 |

FOREIGN PATENT DOCUMENTS

| | | |
|---|---|---|
| JP | 64-5246 | 1/1989 |
| JP | 4-88738 | 3/1992 |
| JP | 4-154242 | 5/1992 |
| JP | 4-257143 | 9/1992 |
| JP | 6-37783 | 2/1994 |
| JP | 7-327048 | 12/1995 |

* cited by examiner

Primary Examiner—Seema S. Rao
(74) Attorney, Agent, or Firm—Katten Muchin Zavis Rosen

(57) ABSTRACT

In a telecommunication network, each node is provided with the same physical topology information relating to a physical construction of telecommunication paths included in the telecommunication network and with the same logical topology information relating to routing of telecommunication paths. When a failure occurs, restoration is effected by transmitting information relating to the failure that has occurred in the telecommunication network, throughout the network. Each node that receives the information relating to the failure determines alternative paths for bypassing the failure using the information relating to the failure, the physical topology information, and the logical topology information. Then service is switched to the alternative paths.

16 Claims, 9 Drawing Sheets

L i (WORKING, SPARE)

PHYSICAL TOPOLOGY TABLE

| L | W | S |
|---|---|---|
| 1 | 6 | 5 |
| 2 | 3 | 6 |
| 3 | 5 | 6 |

LOGICAL PATHS SET

LOGICAL TOPOLOGY TABLE

| C | PATHS SET |
|---|---|
| 3 | 1 ↔ 3 ↔ 2 |
| 2 | 2 ↔ 1 ↔ 3 |
| 4 | 1 ↔ 2 |

CAPACITY TO BE RESTORED

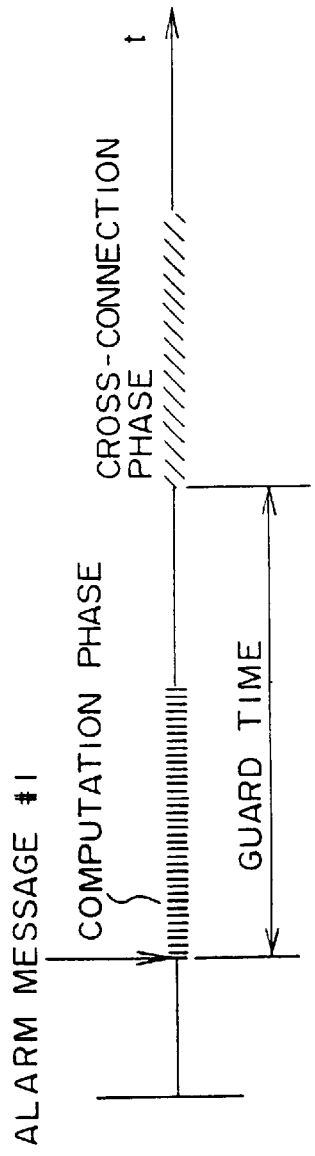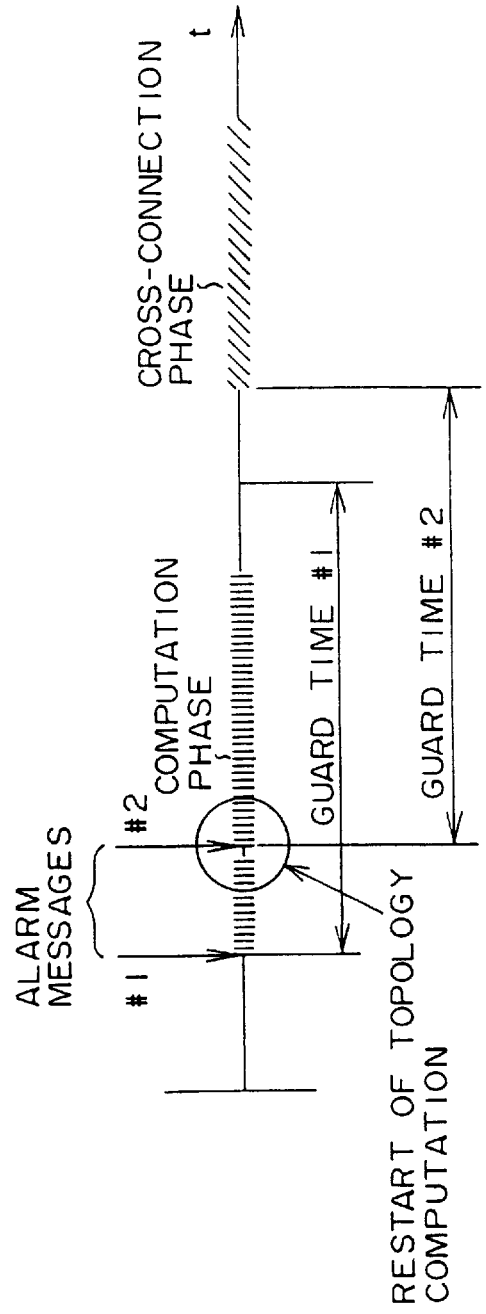
FIG. 3A
FIG. 3B

COMMUNICATION NODE, RESTORATION METHOD AND COMMUNICATION NETWORK

BACKGROUND OF THE INVENTION

1. Field of the Invention

The present invention generally relates to networks using cross-connect units at telecommunication nodes, and more particularly to an automatic restoration method in a mesh network.

A synchronous transfer mode (STM) network and an asynchronous transfer mode (ATM) network capable of transmitting audio and visual data at a high speed have been in use in recent years to provide various services. One example of such a network is a mesh network in which telecommunication nodes provided with cross-connect units and telecommunication links are arranged in a mesh configuration.

Such a network should be configured so as to be capable of continuing to serve the user in the event of a failure. Continuation of services requires that a failure occurring in the network be automatically detected and telecommunication paths that enable bypassing of the failure be established. An automatic restoration method is an essential algorithm specifying a procedure for establishing the paths.

2. Description of the Prior Art

There are generally two types of automatic restoration methods proposed for mesh networks: the pre-planned restoration method and the dynamic restoration method. In the pre-planned restoration method, a configuration map specifying alternate paths is stored at each cross-connect unit.

In the event of a failure, alternate paths are set according to the configuration map. Hence, a high-speed restoration is possible. Information relating to the alternate paths is computed by the central Operation Systems and distributed throughout the nodes.

In the dynamic restoration method, each node is not provided with the above-described configuration map. In the event of a failure, nodes adjacent to the point of failure exchange restoration-related messages several times so as to find alternate paths.

However, the above-described conventional technology has the following problems. In the pre-planned restoration method, the process executed by the central Operation Systems to distribute the information relating to alternate paths to the nodes may be complex and lengthy. Further, when an additional failure (i.e., a secondary failure) occurs during the computation for finding alternate paths or during the distribution of the information, an updating computation and a distribution of the updated information to the nodes are required. Hence, the process required for the restoration becomes complex. Further, since each node is required to store the information in a memory, restoration capabilities for various failure scenarios are limited.

In the dynamic restoration method, restoration messages are exchanged between the nodes to search for alternate paths. Hence, a prompt restoration cannot be hoped for in comparison with the pre-planned restoration method.

SUMMARY OF THE INVENTION

Accordingly, an object of the present invention is to provide a telecommunication node, a restoration method and a telecommunication network, wherein the aforementioned problems are eliminated.

Another and more specific object of the present invention is to provide a telecommunication node, a restoration method and a telecommunication network, wherein a prompt restoration is possible using a simple process.

The aforementioned objects can be achieved by a restoration method in a telecommunication network in which each node is provided with physical topology information relating to a physical construction of telecommunication paths included in the telecommunication network and logical topology information relating to routing of telecommunication paths, said restoration method comprising the steps of:

(a) transmitting information relating to a failure that has occurred in the telecommunication network, throughout the network;

(b) in each node that has received said information relating to the failure, determining alternate paths for bypassing the failure using said information relating to the failure, said physical topology information, and said logical topology information; and (c) switching services to the alternate paths determined in step (b).

The aforementioned objects can also be achieved by a telecommunication node provided with physical topology information relating to a physical construction of telecommunication paths included in the telecommunication network and logical topology information relating to routing of telecommunication paths, said telecommunication node comprising:

first means transmitting information relating to a failure that has occurred in the telecommunication network, throughout the telecommunication network;

second means determining alternate paths for bypassing the failure using said information relating to the failure, said physical topology information, and said logical topology information; and third means switching services to the alternate paths determined by said second means.

The aforementioned objects can also be achieved by a telecommunication network including telecommunication nodes each provided with physical topology information relating to a physical construction of telecommunication paths included in the telecommunication network and logical topology information relating to routing of telecommunication paths, wherein each node comprises:

first means transmitting information relating to a failure that has occurred in the telecommunication network, throughout the telecommunication network;

second means determining alternate paths for bypassing the failure using said information relating to the failure, said physical topology information, and said logical topology information; and third means switching services to the alternate paths determined by said second means.

According to the restoration method, the telecommunication node and the telecommunication network of the present invention, restoration from failure is attained by using topology tables relating to the entirety of the network. Only information (message) relating to a failure needs to be exchanged for restoration. Therefore, the present invention realizes a high-speed restoration from failure with smaller volume of messages exchanged as compared with the conventional dynamic restoration method.

In further accordance with the present invention, reception of information relating to a failure is properly controlled so that cross-connection in a node is prevented from being executed in a transient state in which latest information relating to a failure has not arrived yet. Accordingly, it is possible to restore from failure using the latest topology information.

According to one preferred embodiment of the present invention, topology information is automatically updated so that the nodes in a network are provided with latest topology information relating to the entirety of the network which information is necessary for cross-connecting process executed in the event of a failure.

By executing, in each node, computation for finding alternate paths adapted for typical scenarios such as those involving a single link failure or a single node failure, a high-speed restoration from failure is realized.

According to another aspect of the present invention, restoration from failure can take place only by switching from a failed path to an alternate virtual path. Thus, a high-speed restoration is realized.

In further accordance with the present invention, alternate path selection most suitable for a failure type is employed so that a high-speed restoration is realized.

BRIEF DESCRIPTION OF THE DRAWINGS

Other objects and further features of the present invention will be apparent from the following detailed description when read in conjunction with the accompanying drawings, in which:

FIG. 3A is a timing chart explaining a guard time introduced in the restoration method of the present invention;

FIG. 3B is a timing chart explaining a guard time introduced in the restoration method of the present invention;

DESCRIPTION OF THE PREFERRED EMBODIMENTS

The basic algorithm for the restoration process according to the present invention is as follows. Each node in the network retains physical topology information relating to the physical construction of the telecommunication links included in the network and logical topology information relating to routing of paths formed in the links. In the event of a failure in the link or the node, the node adjacent to the location of the failure broadcasts a message to the other nodes in the network to indicate where the failure has occurred. Using the received message, each node performs computation for finding alternate paths so as to restore the telecommunication path for itself. By switching to the alternate paths determined as a result of the computation, a high-speed restoration based on a simple procedure is attained. More specifically, the aforementioned basic algorithm for the restoration process is composed of a broadcast phase, a computation phase and a cross-connection phase.

Figure 1A:
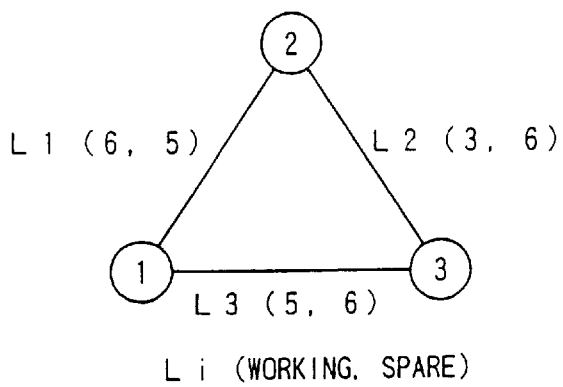
FIG. 1A shows a telecommunication network and associated physical topology information.

A description will now be given, with reference to FIGS. 1A and 1B, of the physical topology and the logical topology. FIG. 1A shows a telecommunication network and associated physical topology information. The telecommunication network shown has three nodes 1–3 and three telecommunication links L1, L2 and L3 connecting the nodes. The physical topology information indicates the physical construction of the links L1–L3, that is, the number of working (W) channels and the number of spare (S) channels formed on the links. In the example shown in FIG. 1A, L1 (6, 5) indicates that link 1 (L1) contains six working channels and five spare channels. Each of the nodes 1–3 keeps a table (physical topology table) as shown storing the physical topology information. Each of the nodes always keeps the physical topology information identical to each other.

Figure 1B:
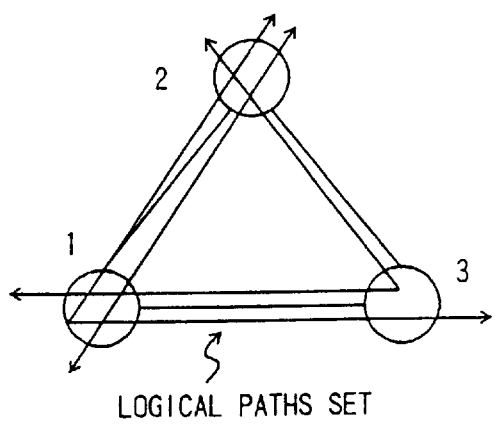
FIG. 1B shows logical paths set and logical topology information in the telecommunication network shown in FIG. 1A.

FIG. 1B shows logical paths set and logical topology information in the telecommunication network shown in FIG. 1A. The logical topology information is routing information for the paths formed between the nodes. For instance, the logical topology information may indicate a path formed between the node 1 and the node 2 via the node 3. The logical topology information also indicate the number of channels (capacity) to be restored in the path. Each of the nodes keeps a table (logical topology table) as shown storing the logical topology information.

A description will now be given of the broadcast phase. In the event of a failure in a link or a node in the network, nodes adjacent to the location of the failure detect the failure. For instance, in the SONET network (the standard transport network in the United States), a node in the downstream of a failed location may receive an L-AIS (line-alarm indication signal) or an LOF (loss of frame) signal. A node in the upstream of the failed location may receive a FERF (far end receive failure) signal so as to recognize that a failure has occurred. The node that detected the failure prepares an alarm message and broadcasts the same in order to notify all the nodes in the network of the failure.

A description will now be given of the computation phase. The node that receives the alarm message executes computation (topology computation) for finding alternate paths using the topology information common to the nodes and stored in the physical topology table and the logical topology table. Consistent computation results (alternate paths) are obtained at each node, because common topology information of the network and a common computation algorithm for finding alternate paths are available and used in each mode. A known algorithm such as Dijkstra's algorithm may be used in the computation.

A description will now be given of the cross-connection phase. A node which has completed the topology computation starts the cross-connection depending on the result of topology computation so that services are switched from the failed path to the alternate path. Some nodes might not require cross-connection depending on the result of topology computation. Dynamic restoration protocols generally execute the cross-connection process synchronously in the final phase of the restoration. However, in the algorithm of the present invention, each node is able to asynchronously execute the cross-connection process. When cross-connection is completed by all nodes in the network, telecommunication along the restored path becomes possible.

Figure 2A:
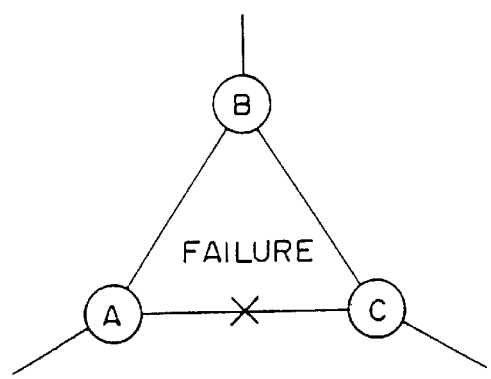
FIG. 2A shows a telecommunication network having three nodes A, B and C.
Figure 2B:
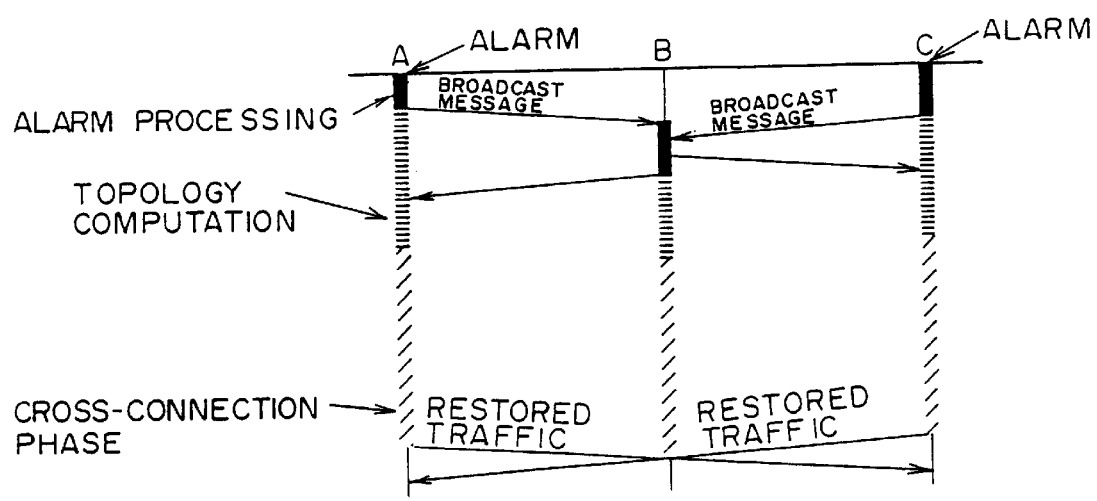
FIG. 2B is a timing chart for the restoration algorithm of the present invention.

FIG. 2A shows a telecommunication network provided with three nodes A, B and C, and FIG. 2B is a timing chart applicable to the restoration executed according to the above described scheme composed of three phases. In the example of FIG. 2A, a failure has occurred on the link between node A and node C. Node A and node C at the respective ends of the failed link detect the failure and enter a failure processing mode. Nodes A and C broadcast an alarm message for notifying the other nodes that a failure has occurred. The process executed so far concerns the broadcast phase.

Nodes A and C enter the computation phase after broadcasting the alarm message. Node B receives the alarm message broadcast from node A and node C. After recording the content of the message, node B broadcasts the alarm message. Thereupon, node B enters the computation phase. In the computation phase executed in nodes A–C, the topology computation is performed using the common topology information stored in the physical topology table and the logical topology table kept in each node. Consistent computation results (alternate paths) are obtained at each node, because common topology information of the network and a common computation algorithm for finding alternate paths are available and used in each mode.

Once the computation result is obtained in nodes A–C, each node enters the cross-connection phase. Nodes A–C switch services to the alternate path asynchronously according to the result obtained. Illustration of the alternate path thus determined is omitted in FIG. 2.

According to the above-described method, each node enters the computation phase after receiving the broadcast alarm message. Once the computation result is obtained, each node immediately enters the cross-connection phase. However, a node may receive a plurality of broadcast alarm messages in the event of a failure. If the plurality of alarm messages received relate to the same failure, no problem is created because the computation results obtained in accordance with the alarm messages are identical to each other. In the example shown in FIG. 2A, nodes A and C generate alarm messages which produce the same result in the topology computation. However, when a secondary failure occurs, for example, the plurality of alarm messages received successively by a node have different contents. In this case, the computation result obtained in accordance with the first alarm message received does not reflect the secondary failure, for example, that is, does not indicate the most up-to-date alternate path.

In order to avoid such an inconvenience, once the alarm message indicating the location of the failure has reached a node, the old computation process that has been executed in the node to find the alternate path is initialized. Thereupon, the computation for finding the alternate path is restarted using the old alarm message that the node received. In this way, it is possible to search for the most up-to-date alternate path. In addition, allowing for the possibilities of an additional alarm message arriving after the computation process is completed, it is necessary to wait at each node in the network until a guard time expires after the last topology computation is completed, before proceeding to the cross-connection phase.

FIGS. 3A and 3B are timing charts showing the above-described process. As shown in FIG. 3A, a node enters the computation phase after receiving an alarm message #1. Even if the computation is completed, the node does not execute a cross-connection until a guard time for the alarm message #1 expires.

Referring to FIG. 3B, a node enters the computation phase after receiving the alarm message #1, whereupon a guard time #1 is started. If another alarm message #2 is received in the process of computation, the computation is discontinued. A new computation allowing for the alarm message #2 is started. A new guard time #2 is started at the beginning of the new computation. When the guard time #2 expires, the node enters the cross-connection phase.

A description will now be given of how the physical topology table and the logical topology table maintained by each node are updated.

As has been described, the physical topology table and the logical topology table maintained by the nodes must have the common content. It is also necessary for the tables to reflect a secondary failure promptly. The physical topology is updated when the system is changed or a failure has occurred. This means that the physical topology is updated relatively infrequently. In contrast, the frequency that the logical topology is updated is higher than that of the physical topology. For instance, the logical topology must be updated whenever the path establishments are changed as requested by customers. Each node executes the process for updating the physical topology and the logical topology autonomously. The physical topology table and the logical topology table relating to the network maintained in each node are communicated from a node to all the other nodes in the network either periodically or at random intervals. In this way, the nodes can update the respective topology tables autonomously even when the OS issues an instruction that forces a change in the path establishments.

Figure 4A:
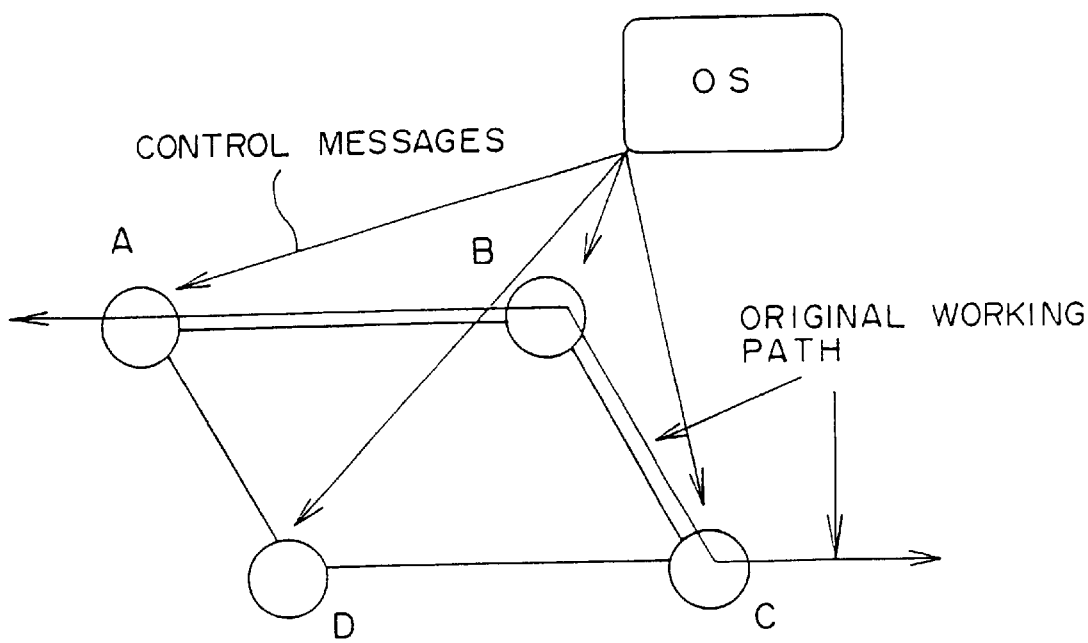
FIG. 4A shows a part of a process of updating topology information.
Figure 4B:
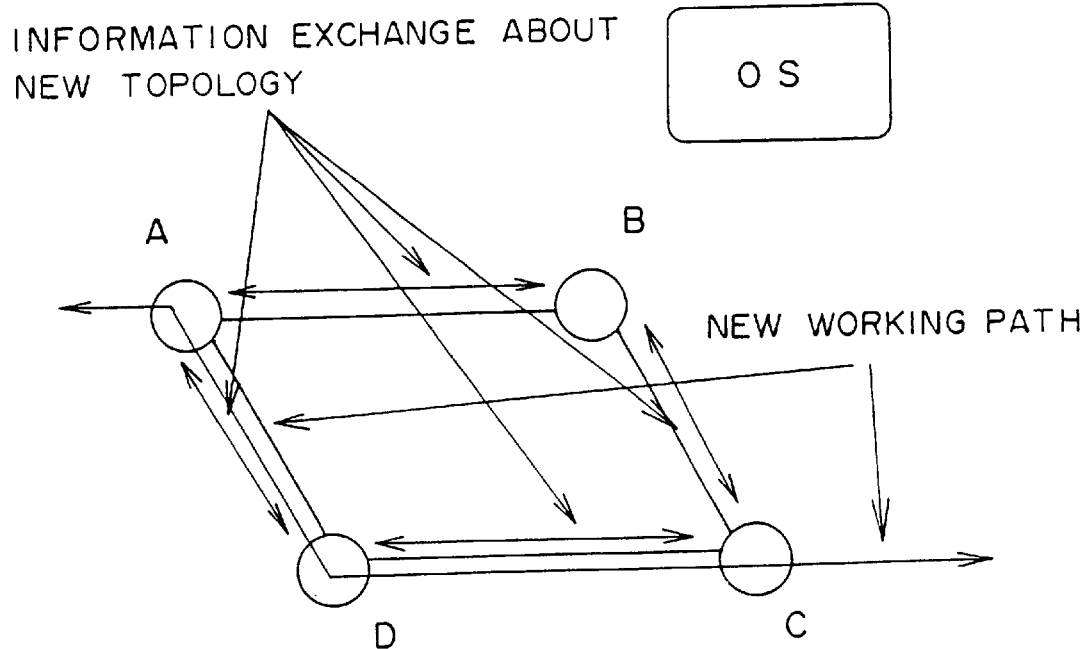
FIG. 4B shows another part of the process of updating topology information.

A description of the topology updating process will now be given using the logical topology as an example. FIGS. 4A and 4B show the process for updating the logical topology. Referring to FIG. 4A, the original working path goes from node A to node C through node B. To reassign the original path passing through node D instead of node B, the OS sends control messages to corresponding nodes A–D to notify them of the change. To update the logical topology table in each node after this path change, network nodes communicate with each other as shown in FIG. 4B. A similar process occurs in updating the physical topology table. The OS is not participating in the updating process.

If the entirety of the topology tables that nodes A–D maintain is to be confirmed by message exchanges between the nodes via the network, the information passed in the network amounts to an extraordinary volume. Accordingly, only the checksum (for example, the CRC checksum) of the physical topology table and the logical topology is transmitted instead of the whole table. Thereupon, nodes A–D make comparisons of the checksum transmitted. If the checksums are different from those received by other nodes, the node will then have to communicate with other nodes so that the same topology tables are maintained in the nodes.

A description will now be given of how the speed of the topology computation can be increased. As has been described, the topology computation is executed in the computation phase using a known algorithm adopted to search for the shortest path. Each node executes the computation using the physical topology table, the logical topology table and the alarm message received, according to the same algorithm.

It is possible for each node to execute topology computation adapted for different typical failure scenarios such as those involving a single link failure and a single node failure, before an actual failure occurs, using the physical topology table and the logical topology table maintained in each node. This computation (pre-computation) is done autonomously and the result thereof is stored in a predetermined part of the node. In this way, it is possible to restore services in the event of a typical failure without executing the computation. It is advisable to provide a guard time in this case, too. However, the guard time in this case may be shorter than when the pre-computation is not carried out.

A description will now be given of selection of the restoration method depending on the condition of a failure. Three types of alternate path selection may be employed: the line restoration method; the path restoration method; and the 2-hop restoration method. It is preferable that a restoration method most suitable for the condition of the failure be selected.

Figure 5A:
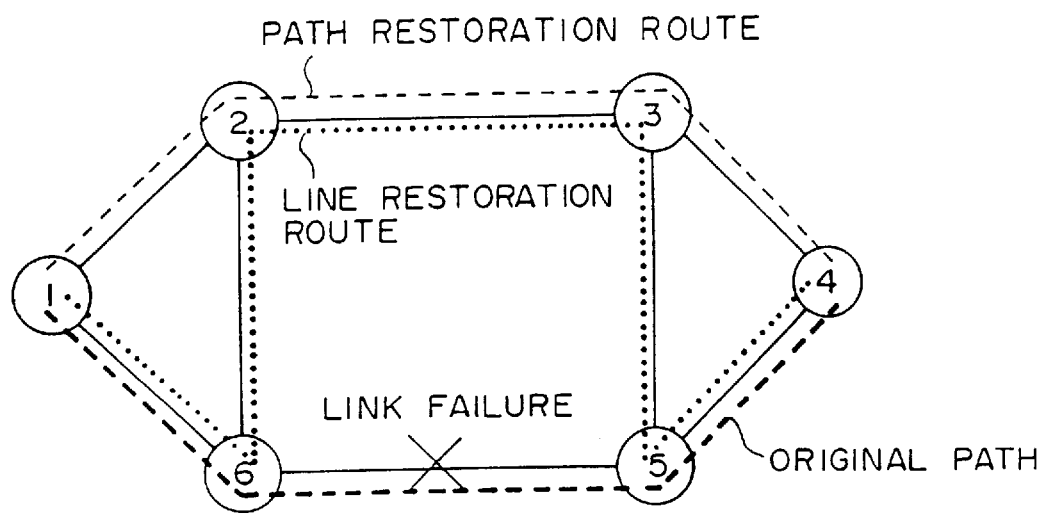
FIG. 5A shows a line restoration method and a node restoration method.
Figure 5B:
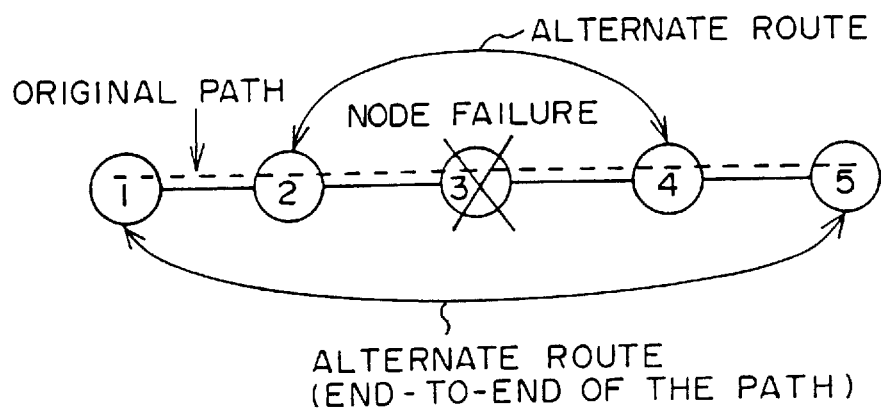
FIG. 5B shows a 2-hop restoration method.

FIG. 5A shows the line restoration method and the path restoration method, and FIG. 5B shows the 2-hop restoration method. Referring to FIG. 5A, when a failure occurs between nodes 5 and 6, a path connecting nodes 6, 2, 3 and 5 and bypassing a failed link connecting nodes 5 and 6 at its ends is set according to the line restoration. The same failure as above is processed according to the path restoration such that an alternate path connecting nodes 1, 2, 3 and 4 is set in place of the path on the failed link, that is, the path connecting nodes 1, 6, and 4. Referring to FIG. 5B, a failure indicated by X and occurring in node 3 is processed by the 2-hop restoration method such that an alternate path is set between nodes 2 and 4 adjacent to node 3.

The line restoration method provides a faster restoration from a link failure than the path restoration. However, the line restoration cannot handle node failures. While the path restoration method can handle node failures, it takes longer to restore with the path restoration method than with the line restoration method. The 2-hop restoration method is a high-speed restoration method that includes features of these restoration methods and can handle node failures. However, the 2-hop restoration method cannot handle a plurality of successive failures. One of the above-described restoration schemes is used depending on the type of failure that has occurred.

Figure 6:
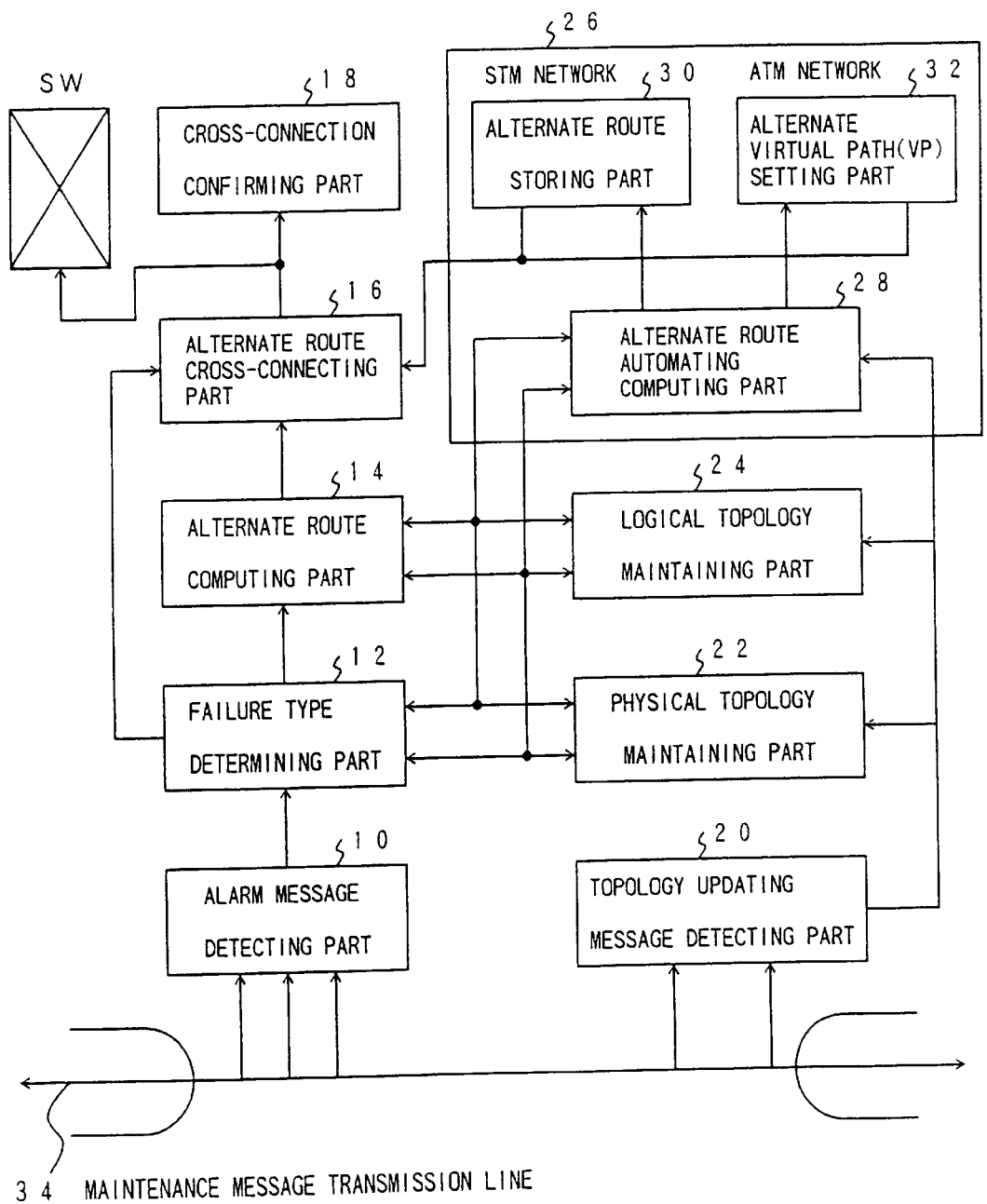
FIG. 6 is a block diagram showing the construction of a telecommunication node according to an embodiment of the present invention.

FIG. 6 shows a node having the construction that realizes the restoration schemes described above. The node shown is connected to an STM or ATM network for transporting audio and image data, and to a maintenance message transmission line 34 for transmitting control messages and alarm messages from the OS.

The node shown in FIG. 6 comprises an alarm message detecting part 10, a failure type determining part 12, an alternate path computing part 14, an alternate path cross-connecting part 16, a cross-connection confirming part 18, a topology updating message detecting part 20, a physical topology maintaining part 22, a logical topology maintaining part 24 and a restoration preparing part 26. The restoration preparing part 26 includes an alternate path automatic computing part 28 and an alternate path storing part 30 and/or an alternate virtual path (VP) setting part 32.

The alarm message detecting part 10 detects an alarm message transmitted via the maintenance message transmission line 34 and passes the same to the failure type determining part 12. The failure type determining part 12 determines the location and type of the failure by referring to the information included in the alarm message, the physical topology information and the logical topology information. For example, the failure type determining part 12 determines whether or not the failure is a node failure or a link failure. In the event of a failure, a plurality of alarm messages are generated by nodes adjacent to the location of the failure. For example, in case of a link failure, two nodes generate the alarm message. In case of a node failure, as many as three nodes may generate the alarm message. In accordance with the plurality of messages, the location and type of failure are determined. Of course, it is possible to obtain information relating to the failure from a single alarm message. The number of messages involved in the determination depends on the construction of the network.

In response to the determination by the failure type determining part 12, the alternate path computing part 14 computes topology information to find alternate paths by referring to the physical topology information and the logical topology information. The computation is done using an algorithm such as Dijkstra's algorithm. On the basis of the result of computation, the alternate path cross-connecting part 16 issues an instruction for cross-connection to a cross-connect switch SW in the node so as to execute the actual cross-connection. After the node executes the cross-connection process, the cross-connection confirming parts 18 in the nodes work in cooperation so as to confirm whether or not the alternate paths set can operate properly.

The topology updating message detecting part 20 detects a control message from the OS and a topology updating message (for example, a message including a checksum) exchanged between nodes to update the topology information. The physical topology maintaining part 22 maintains the physical topology table as shown in FIG. 1A relating to the entirety of the network. The logical topology maintaining part 24 maintains the logical topology table as shown in FIG. 1B relating to the entirety of the network. The alternate path automatic computing part 28 of the restoration preparing part 26 pre-computes to find alternate paths adapted to typical failure scenarios involving a single link failure, a single node failure or the like, by referring to the physical topology table and the logical topology table. The alternate path automatic computing part 28 stores the computation result in an internal memory. There is no need to execute pre-computation adapted for all possible cases of single link failures and single node failures. The volume of pre-computation may depend on the storage capacity of the alternate path storing part 30 or the alternate VP setting part 32.

Upon detecting that the failure is a single node failure or a single link failure, the failure type identifying part 12 reads the computation result associated with the failure type from the alternate path storing part 30 or the alternate VP setting part 32 via the alternate path automatic computing part 28. The failure type identifying part 12 outputs the read result to the alternate path cross-connecting part 16.

It will be noted that telecommunication in the ATM network takes place using the virtual path (VP) connection. VPs with zero capacity can be preallocated as backups of working VPs on the basis of the result of the topology pre-computation. When a failure is detected and an alarm message is received by nodes adjacent to the location of the failure, a high-speed service restoration is realized by switching from the working path to the preset alternate virtual path. The aforementioned alternate VP setting part 32 stores the topology pre-computation result relating to zero-capacity alternate virtual paths adapted for typical failures.

In the STM network, a path is set by allocating data to time slots. Therefore, it is impossible to set virtual alternate paths. For this reason, in the STM network, the alternate path storing part 30 only stores the result of the topology pre-computation. When an actual failure occurs, the information relating to the alternate paths adapted for the failure type identified by the failure type identifying part 12 is read from the alternate path storing part 30 under the control of the alternate path automatic computing part 28. The read result is output to the alternate path cross-connecting part 16.

For example, the pre-computation is executed by the alternate path automatic computing part 28 immediately after a restoration from a failure or at regular intervals. Only when there is a difference from the old pre-computation result, the updated pre-computation result is reflected in the alternate path storing part 30 or the alternate VP setting part 32.

Figure 7:
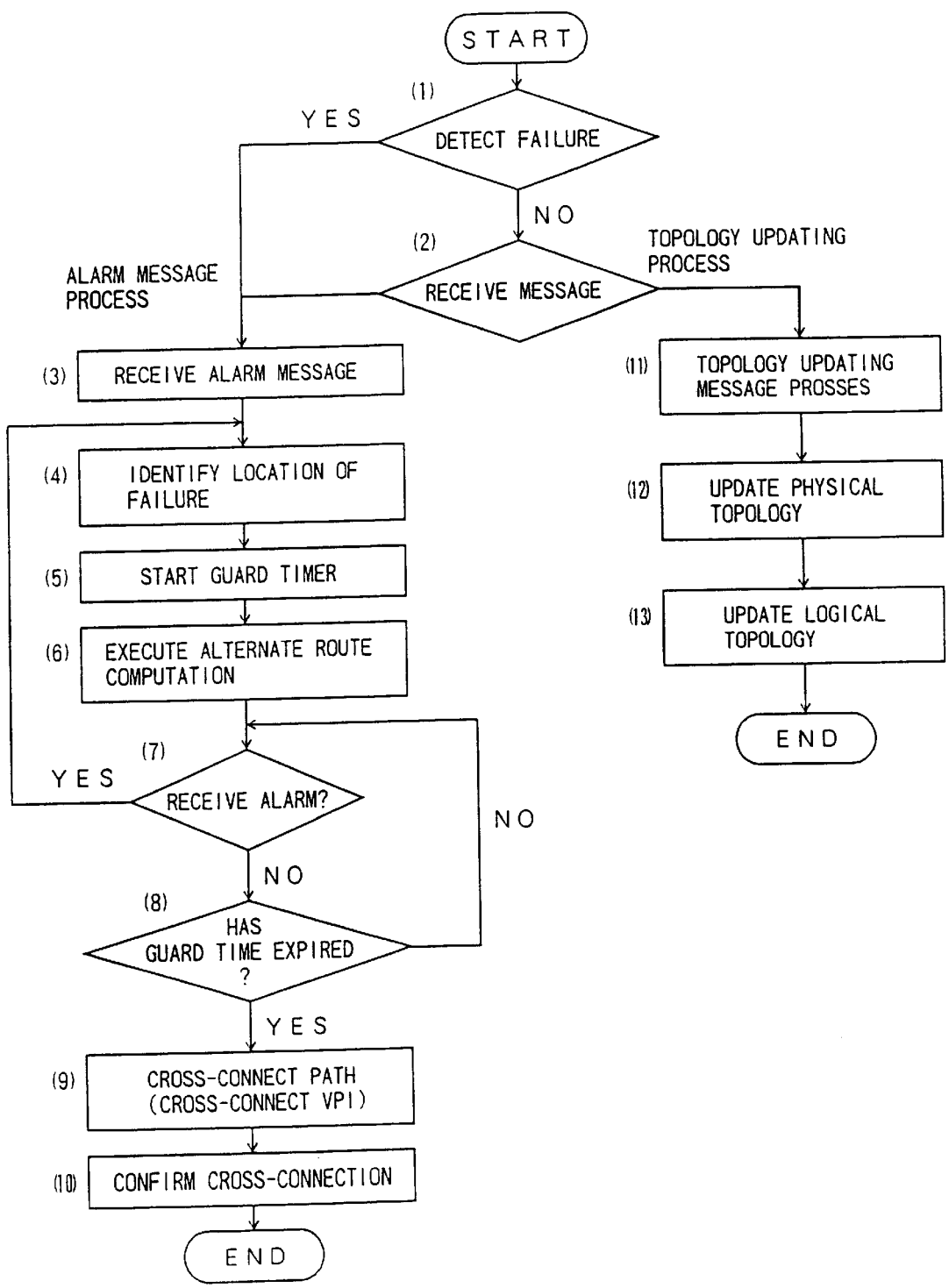
FIG. 7 is a flowchart (1) showing the operation of the telecommunication node shown in FIG. 6.
Figure 8:
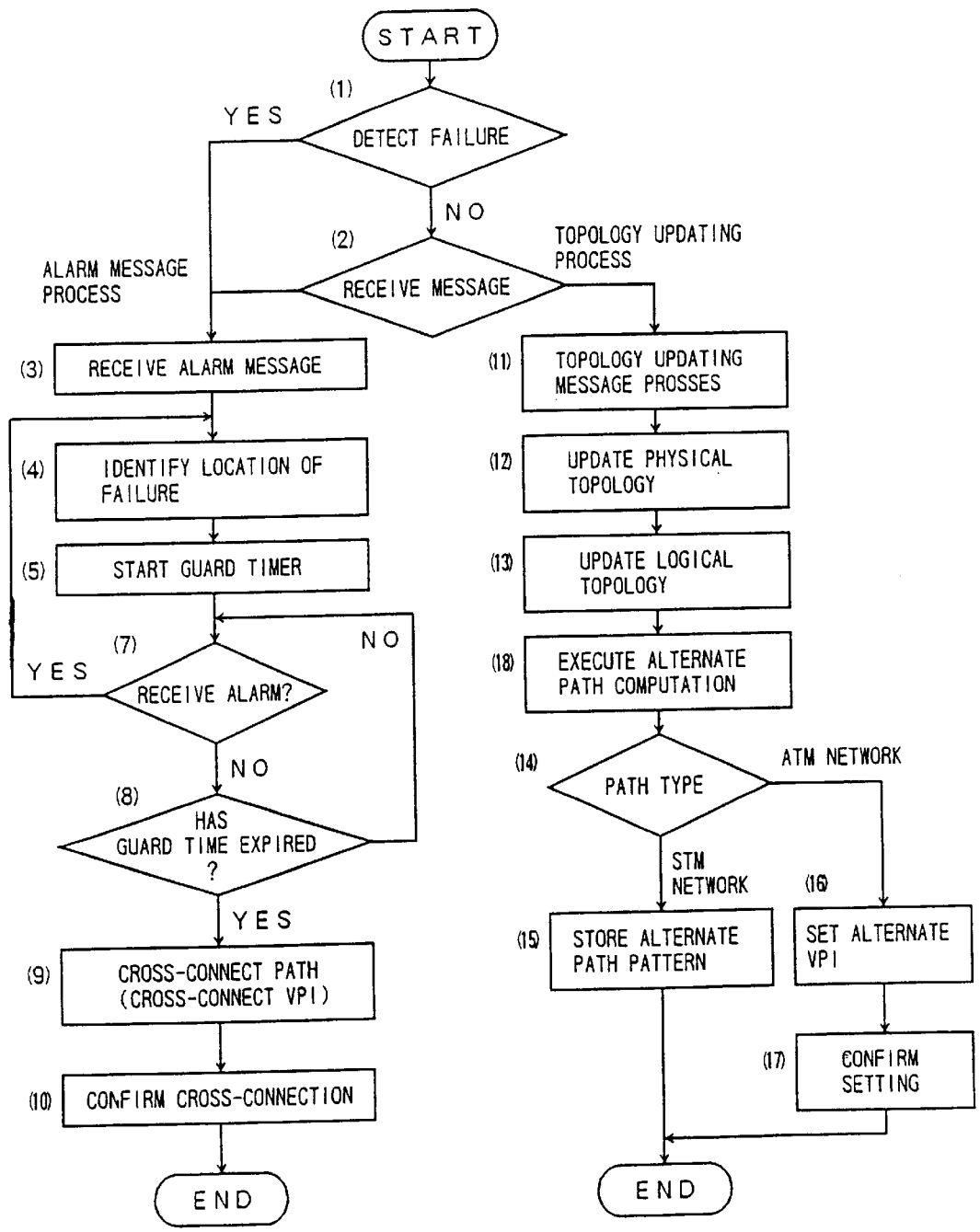
FIG. 8 is a flowchart (2) showing the operation of the telecommunication node shown in FIG. 6.

A description will now be given, with reference to FIGS. 7 and 8, of the operation of the node shown in FIG. 6. FIG. 7 is a flowchart of the process of restoration from a failure, and FIG. 8 is a flowchart of the process of restoration from a failure, wherein the topology pre-computation is executed.

Referring to FIG. 7, a determination is made in step (1) as to whether or not a failure is detected from an interruption of an optical signal or the like. If a failure is detected, the control is turned over to a process (step (3)) whereby an alarm message is sent to adjacent nodes. If no failure is detected, the control is turned over to a process (step (2)) for determining whether or not an additional message is received. Two types of messages may be received: an alarm message for warning of a failure on a transmission path; and a topology updating message that does not directly relate to a failure in the network. The type of the message received is determined and its content is passed to an associated message process. In case an alarm message is received, the control is turned over to an alarm message process described later. In case a topology updating message is received, the control is turned over to a topology updating process described later.

If a failure is detected or an alarm message is received from an adjacent node while step (3) is being executed, the alarm message that has been sent continues to be sent. The alarm message is sent to adjacent links other than the failed link and the link from which an alarm message is passed. No message that derives from the same factor is sent from a given node.

In step (4), the location of the failure is identified by referring to the alarm message received, and to the physical topology information and the logical topology information maintained in the node. In case of the link failure, nodes at the ends of the failed link send the alarm message. In case of a node failure, the location of failure is identified by receiving the alarm message from nodes adjacent to the failed node.

In step (5), a guard timer is started. During the guard time, an additional alarm that may be received during the topology computation is monitored. The time set is longer than the maximum time required for the topology computation so as to provide sufficient time for an alarm message indicating a failure to be transmitted throughout the network irrespective of the location of the failure in the network.

In step (6), topology computation is executed. The computation is executed based on the alarm message received, using an algorithm such as Dijkstra's algorithm or the like. In this computation, the physical topology table and the logical topology table are used.

In step (7), a determination is made as to whether or not an additional alarm message is received during the computation. If an additional alarm message is received, the control is returned to the process for identifying the failure type. If no additional alarm message is received, the control is turned over to a step (8) for determining whether or not a guard time has expired.

If it is found in step (8) that the guard time set in a guard timer has not expired, the control is returned to step (7). If the guard time has expired, the control is turned over to a step (9).

In step (9), a cross-connecting process for switching to alternate paths is executed in each node, in accordance with the result of the topology computation. In step (10), a confirmation is made after the cross-connecting process as to whether or not the alternate paths are properly set.

A description will now be given of the topology updating process comprising steps (11)–(13). In step (11), the topology updating message received from an adjacent node is passed to adjacent nodes. In step (12), the physical topology table is updated on the basis of the content of the topology updating message received. In step (13), the logical topology table is updated on the basis of the content of the topology updating message received.

A description will now be given, with reference to FIG. 8, of a process of restoration from a failure, wherein the topology pre-computation is executed. In FIG. 8, those steps that are the same as the steps of FIG. 7 are designated by the same numerals. The alarm message process in FIG. 8 lacks the alternate path computation process of step (6) shown in FIG. 7. That is, the determination of step (7) is made after the guard timer is started in step (5). As will be described in the following, the topology computation process shown in FIG. 7 is not necessary in the alarm message process of FIG. 8 since the topology pre-computation has been executed.

In the topology updating process shown in FIG. 8, steps (11)–(13) are the same as the corresponding steps shown in FIG. 7. After step (13) is executed, the topology computation is executed in step (18). That is, the computation of alternate paths adapted for typical failures such as those involving a path failure or a node failure is executed on the basis of the alarm message received, using an algorithm such as Dijkstra's algorithm. In this computation, the physical topology table and the logical topology table are used.

In step (14), the type of the path to be restored is identified. In the STM network, the control is then turned over to step (15). In the ATM network, the control is turned over to step (16). In step (15), the alternate path patterns are stored. That is, the patterns of path establishments that concern a given node are selected from the entire body of information obtained through the topology computation and stored in that node. In step (16), the alternate VPI is set. It will be noted that the alternate VP has a zero capacity. In step (17), the alternate VP set in step (16) is confirmed.

Figure 9:
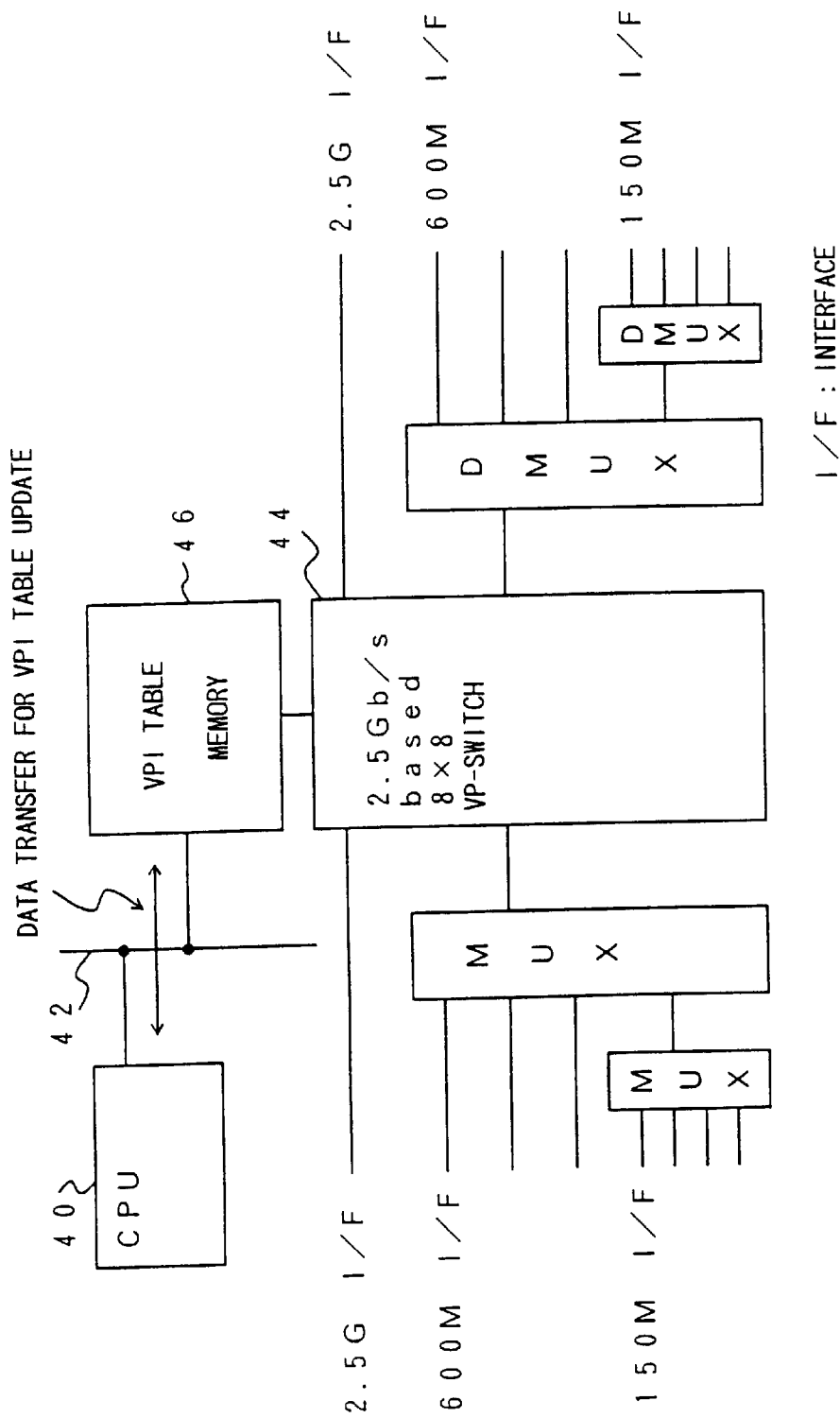
FIG. 9 is a block diagram showing the construction of a node in an ATM network, according to the present invention.

FIG. 9 is a diagram showing the construction of an ATM node to which the construction shown in FIG. 6 is applied. A description will now be given of how the construction shown in FIG. 6 corresponds to the construction shown in FIG. 9. The components 10 through 32 (except for the alternate path storing part 30) that concerns the STM network in the construction shown in FIG. 6 correspond to a CPU 40 shown in FIG. 9. The maintenance message transmission line 34 shown in FIG. 6 corresponds to an internal local area network (LAN) 42 shown in FIG. 9. Further, the switch SW shown in FIG. 6 corresponds to a VP-switch 44 shown in FIG. 9. The VP-switch 44 switch ATM cell according to VPI table 46. The VPI table 46 is constructed in an assumption that the zero-capacity alternate virtual path is set by the alternate VP setting part 32 shown in FIG. 6. In FIG. 9, MUX denotes a multiplexor, and DMUX a demultiplexor.

The present invention is not limited to the above described embodiments, and variations and modifications may be made without departing from the scope of the present invention.

What is claimed is:

1. A restoration method in a telecommunication network in which each node is provided with physical topology information relating to a physical construction of telecommunication paths included in the entire telecommunication network and logical topology information relating to routing of telecommunication paths included in the entire telecommunication network, said restoration method comprising the steps of:
    (a) broadcasting information relating to a failure that has occurred in the telecommunication network, throughout the network;
    (b) in each node that has received said information relating to the failure, determining alternate paths for bypassing the failure using said information relating to the failure, said physical topology information, and said logical topology information; and
    (c) in each node, switching services to the alternate paths determined in step (b).

2. The restoration method as claimed in claim 1, further comprising the step of:
    (d) initializing the step (b) when information relating to another failure is received while the step (b) is being executed, within a predetermined guard time, and executing the step (b) again allowing for the information relating to said another failure so that most up-to-date alternate paths are determined.

3. The restoration method as claimed in claim 1, further comprising the step of:
    (e) exchanging between nodes data relating to said physical topology information and said logical topology information at predetermined timings so that the nodes are always provided with the same physical topology information and the same logical topology information.

4. A restoration method in a telecommunication network in which each node is provided with physical topology information relating to a physical construction of telecommunication paths included in the entire telecommunication network and logical topology information relating to routing of telecommunication paths included in the entire telecommunication network, said restoration method comprising the steps of:
    (a) determining by computation in each node and storing in each node alternate paths adapted for typical failures prior to an actual failure;
    (b) broadcasting information relating to a failure that has occurred in the telecommunication network, throughout the network; and
    (c) in each node switching services to the alternate paths determined prior to the actual failure in step (a).

5. The restoration method as claimed in claim 4, wherein said telecommunication network is an asynchronous transfer mode network based on a concept of virtual paths, and zero-capacity alternate virtual paths are set in step (a) as the alternate paths.

6. The restoration method as claimed in claim 1, further comprising the step of:
    (d) identifying the type of failure by referring to the information relating to the failure and received by each node; wherein
    alternate path selection adapted for the type of failure identified in step (g) is employed in step (b).

7. A telecommunication node provided with physical topology information relating to a physical construction of all telecommunication paths included in the entire telecommunication network and logical topology information relating to routing of said telecommunication paths included in the entire telecommunication network, said telecommunication node comprising:
    first means for broadcasting information relating to a failure that has occurred in the telecommunication network, throughout the telecommunication network;
    second means for determining alternate paths for bypassing the failure using said information relating to the failure, said physical topology information, and said logical topology information; and
    third means switching services in each node to the alternate paths determined by said second means.

8. The telecommunication node as claimed in claim 7, further comprising fourth means initializing a process in said second means when information relating to another failure is received while the alternate paths are being determined by said second means, within a predetermined guard time, and executing the process in said second means again allowing for the information relating to said another failure so that most up-to-date alternate paths are determined.

9. The telecommunication node as claimed in claim 7, further comprising fifth means exchanging between nodes data relating to said physical topology information and said logical topology information at predetermined timings so that the nodes are always provided with the same physical topology information and the same logical topology information.

10. The telecommunication node as claimed in claim 7, further comprising sixth means determining by computation and storing alternate paths adapted for typical failures prior to an actual failure; wherein
    the process in said second means is not executed when a typical failure occurs, and said third means is used to switch services to the alternate paths determined prior to the actual failure.

11. The telecommunication node as claimed in claim 10, wherein said telecommunication network is an asynchronous transfer mode network based on a concept of virtual paths, and zero-capacity alternate virtual paths are set by said sixth means as the alternate paths.

12. The telecommunication node as claimed in claim 7, further comprising seventh means identifying the type of failure by referring to the information relating to the failure an receive by each node; wherein
    alternate path selection adapted for the type of failure identified by said seventh means is employed by said second means.

13. A telecommunication network including telecommunication nodes each provided with physical topology information relating to a physical construction of telecommunication paths included in the entire telecommunication network and logical topology information relating to routing of telecommunication paths included in the entire telecommunication network, wherein each node comprises:
    first means broadcasting information relating to a failure that has occurred in the telecommunication network, throughout the telecommunication network;
    second means determining alternate paths for bypassing the failure using said information relating to the failure, said physical topology information, and said logical topology information; and third means switching services in each node to the alternate paths determined by said second means.

14. A restoration method in a telecommunication network comprising the steps of:
   (a) providing each node with similar physical topology information relating to a physical construction of telecommunication paths included in the entire telecommunication network and providing logical topology information relating to routing of telecommunication paths included in the entire telecommunication network;
   (b) broadcasting information relating to a failure that has occurred in the telecommunication network, throughout the network;
   (c) in each node that has received said information relating to the failure, determining alternate paths for bypassing the failure using said information relating to the failure, said physical topology information, and said logical topology information; and
   (d) switching services in each node to the alternate paths determined in step (c).

15. A telecommunication node comprising:
   storing means provided with physical topology information relating to a physical construction of telecommunication paths included in an entire telecommunication network and logical topology information relating to routing of telecommunication paths included in the entire telecommunication network, said informations being similar at each node in said network;
   first means broadcasting information relating to a failure that has occurred in the telecommunication network, throughout the telecommunication network;
   second means determining alternate paths for bypassing the failure using said information relating to the failure, said physical topology information, and said logical topology information; and
   third means switching services in each node to the alternate paths determined by said second means.

16. A telecommunication network including telecommunication nodes, each said node comprising:
   storing means provided with similar physical topology information relating to a physical construction of telecommunication paths included in the entire telecommunication network and similar logical topology information relating to routing of telecommunication paths included in the entire telecommunication network;
   first means broadcasting information relating to failure that has occurred in the telecommunication network, throughout the telecommunication network;
   second means determining alternate paths for bypassing the failure using said information relating to the failure, said similar physical topology information, and said similar logical topology information; and
   third means switching services in each node to the alternate paths determined by said second means.

* * * * *

UNITED STATES PATENT AND TRADEMARK OFFICE
CERTIFICATE OF CORRECTION

PATENT NO. : 6,430,150 B1
DATED : August 6, 2002
INVENTOR(S) : Mitsuhiro Azuma et al.

It is certified that error appears in the above-identified patent and that said Letters Patent is hereby corrected as shown below:

<u>Title page,</u>
Item [73], please add the second Assignee: -- Telecordia Technologies, Inc., Morristown (NJ) --

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.    : 6,430,150 B1
DATED         : August 6, 2002
INVENTOR(S)   : Mitsuhiro Azuma et al.

It is certified that error appears in the above-identified patent and that said Letters Patent is hereby corrected as shown below:

<u>Title page,</u>
Item [73], Assignee, should read  -- Telcordia Technologies, Inc., Morristown (NJ) --

Signed and Sealed this

Sixth Day of January, 2004

JAMES E. ROGAN
*Director of the United States Patent and Trademark Office*